(12) United States Patent
Kikuchi et al.

(10) Patent No.: US 6,798,787 B2
(45) Date of Patent: Sep. 28, 2004

(54) NETWORK SYSTEM AND COMMUNICATION BAND CONTROL METHOD THEREOF

(75) Inventors: Hisao Kikuchi, Hitachi (JP); Atsushi Matsuno, Hitachi (JP); Kiyokazu Tamura, Naka (JP); Yoshiaki Adachi, Hitachiota (JP); Hideki Tonooka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 606 days.

(21) Appl. No.: 09/794,171

(22) Filed: Feb. 27, 2001

(65) Prior Publication Data
US 2002/0012359 A1 Jan. 31, 2002

(30) Foreign Application Priority Data

Jul. 25, 2000 (JP) ........................................ 2000-223665
Feb. 14, 2001 (JP) ........................................ 2001-036296

(51) Int. Cl.[7] ................................................ H04J 3/22
(52) U.S. Cl. ........................ 370/468; 370/449; 370/477
(58) Field of Search ................................ 370/338, 449, 370/451, 452, 455, 468, 477, 461, 242, 241, 243, 244, 245, 246, 255, 256, 258

(56) References Cited

U.S. PATENT DOCUMENTS 6,487,170 B1 * 11/2002 Chen et al. ................. 370/231
6,493,317 B1 * 12/2002 Ma ............................. 370/237
6,574,197 B1 * 6/2003 Kanamaru et al. .......... 370/252
6,594,279 B1 * 7/2003 Nguyen et al. .............. 370/468
6,650,642 B1 * 11/2003 Sugai et al. ................. 370/392

* cited by examiner

Primary Examiner—Dang Ton
Assistant Examiner—Tri H. Phan
(74) Attorney, Agent, or Firm—Kenyon & Kenyon

(57) ABSTRACT

A network system has a plurality of nodes being operated by their communication application programs. In the network system, each of the nodes includes a transmission rate control module for obtaining a communication attribute required for controlling a communication band from the communication application program, a band information managing table for storing the obtained communication attribute, a band information transmitting module for delivering the band information of the local node to all the other nodes connected with the network, a band information receiving module for receiving the band information delivered by the band information transmitting module of another node and storing the band information in the band information managing table. The transmission rate control module is served to obtain the current band traffic on the basis of the band information stored in the band information managing table and perform the band control.

11 Claims, 7 Drawing Sheets

FIG. 3

[BAND INFORMATION MANAGING TABLE]

| IP ADDRESS | PORT NO. | BAND TRAFFIC | TYPE | OPERATING APPLICATION | |
|---|---|---|---|---|---|
| | | | | NUMBER | PROCESS ID LIST |
| 192.168.0.1 | 12345 | 2 Mbps | QoS | 1 | 100 |
| 192.168.0.255 | 12346 | 3 Mbps | QoS | 2 | 101,105 |
| *.*.*.* | FTP | 10 Mbps | BE | 2 | 115,118 |

NODE 2, NODE 3, NODE n

USER'S SETTING

NUMBER OF NODES 26, 261, 262, 263, 264, 265, 266, 267, 268

NETWORK SYSTEM AND COMMUNICATION BAND CONTROL METHOD THEREOF

BACKGROUND OF THE INVENTION

The present invention relates to a communication band control system located in a network, and more particularly to the communication band control system located in an IP network arranged to use an IP (Internet Protocol) as a communication protocol.

Today, it is a matter of course that the advance of the internet and the intranet and the higher performance of hardware, representatively a personal computer, need to run a multimedia application on the internet and the intranet.

As a network medium used for the internet and the intranet, the Ethernet is used, and as an upper protocol an IP (Internet Protocol) is used. The Ethernet and the IP protocol are the band-shared networks. At once, they are the best-effort type networks as well, on which the maximum band is always used for performing the communications without having to depend on the type of the data to be communicated.

On the IP network, therefore, any traffic concerning the WEB applications and the multimedia ones and any mission-critical communication as in an in-company business system may be treated equally so that the traffics and the communications may share the communication band on the same network.

As a result, the file transfer may pressurize the band, so that some disadvantages may take place. For example, the data may be delayed on the mission-critical business application, the communication data as on the WEB application may become an obstacle to securing the communication band, or the fluctuation may take place on the transfer of data such as voice that needs to secure the delay time.

The reason why those disadvantages are brought about is that the IP network uses one shared band as the best effort mode without having to depend on an application and a data type.

In order to overcome those disadvantages, the network segments for data transfer required for guaranteeing the communication quality may be separated from the other network segments in order that a sufficiently wide band may be secured. This remedy needs an additional investment, so that it is not practical.

In light of the foregoing background, the needs on the communication band control technique are rising which technique is for efficiently using the band of the IP network by controlling the communication band to be used for each application and data type.

Today, the following standard techniques on the communication band control has been proposed.

1. RSVP (Resource Reservation Protocol)

RSVP is a signaling protocol that is operated as an upward protocol of TCP/IP and is installed in an application on a terminal and a router. This protocol is executed to issue a message called PATH for reserving a necessary communication band from an application of a requesting terminal to a destination terminal. The PATH message is routed as in the ordinary message and then is sent to the destination terminal. In this routing, all the routers for relaying the PATH message are served to transfer the PATH message to the destination terminal if a requested band is secured and then give back to the requesting terminal a RESV message for representing the band is secured. If the requested band is not secured, a reject message is given back to the requesting terminal. These series of operations make it possible to secure the bands on all the routers on the path leading from the requesting terminal to the destination one.

As noted above, the RSVP is the protocol for reserving the band, which protocol does not cover the implementation of the band. Further, the router located on the communication path is used for managing the band. Hence, the RSVP provides no capability of controlling the band if the requesting terminal and the destination terminal are located on the same segment (subnetwork). In order to overcome this shortcoming, the protocol called SBM (Subnet Bandwidth Manager) that is the expansion of the RSVP is standardized. In the SBM, the band managing server called DSBM (Designated SBM) is contained in the subnet. The PATH message that is sent out of an application on the terminal is transferred to the DSBM if the destination is located in the subnet. The DSBM is served to determine if the band requested by the received PATH message can be secured and then give back the RESV message as a response. It means that the band management within the subnet is executed by the DSBM.

2. DiffServ (Differentiated Services)

The DiffServ is a priority controllable protocol. The application on the terminal is executed to bury a priority to an IP protocol header (DS field) in correspondence with the priority classes categorized according to the significance of the data. Then, a relaying device such as a router is served to recognize the priority and then transfer a packet with a higher priority in order.

The packet with a lower priority is buffered in the relaying device such as a router, so that the packet is delayed or discarded. In place, the flow control may be executed such that the transmission from the terminal is slowed down by changing the window size of TCP/IP so that the buffer may not overflow with a great deal of packets.

In addition, for setting a priority, the priority control on the data link level (Ethernet) is made possible by IEEE802.1p.

For efficiently transmitting the data in the network, the data is transmitted with a large band traffic if the network has enough capacity, while the data is transmitted with a small band traffic if the network does not have enough capacity. That is, it is preferable that the band control may be executed according to the band traffic of the network to be secured when the data is to be transmitted.

The DiffServ (that uses the DS field of the IP protocol or the priority of IEEE802.1p) is executed to determine the priority of the data in advance and then transfer the packet with a higher priority in order. It means that the DiffServ has difficulty in determining the band traffic (transmission data amount per a unit time) on the usage of the band for each communication flow.

On the other hand, the RSVP is designed in view of reserving the band. It can implement the process of securing the band from the sending node to the receiving node but manage the band information for each flow (which band information means the information required for controlling the band) concentratively in the router or the DSBM. It means that the DSBM server is required to be located in the subnet if the RSVP is applied to the band control (traffic control) within the subnet.

In order to make use of the communication capacity in the subnetwork as efficiently as possible, it is necessary to grasp what kind of data flow takes place in the subnetwork (band traffic of the network) and separate the data whose communication quality is to be guaranteed from the data whose communication quality is not to be guaranteed and that is communicated through an idle band when managing and controlling the data to be communicated. If a relaying device such as a router is located in the network, by monitoring the packets passing through the router, it is possible to grasp the band information for each flow and easily grasp the current band traffic. However, the technique is unknown which may apply to the band control in the subnet having no router where all the data packets are passed.

Further, the RSVP needs to make all the terminals be at the same level within the subnet and monitor (capture) all the packets on a leased terminal for the purpose of obtaining the band information from the packets flowing through the network. If the subnet such as 10Base5 or a repeater hub is implemented by one segment, it is possible to obtain the band information by monitoring all the packets, while in the network where the subnet is divided into plural segments by a switching hub, the collection of all the packets within the subnet cannot be implemented by one terminal by means of the particular function of the switching hub, that is, the function that the communication closed inside the segment is not transferred to another segment.

In order to highly efficiently control a band traffic of a communication whose quality is to be guaranteed, as stated above, it is becoming necessary to grasp the band traffic and suppress to a minimum a difference between the presumed band traffic and the actual band traffic flowing through the network when the band control is executed.

The packets flowing through the network are classified into communication data for an application (effective communication data) and various protocols control data including the data retransmitted by a recovery protocol. In particular, it is known that though the latter data is inevitably brought about as an overhead of the former data, the data amount greatly depends on the communication quality. This is obvious because the degraded network communication quality causes data loss and thus the data is to be retransmitted for recovering the data loss.

In order to make use of the restricted band of the network as efficiently as possible, therefore, it is essential to control the communication quality so that in particular the data retransmitted by the recovery protocol does not press the band of the effective communication data. That is, it means that it is essential to control the communication quality so that the actual band traffic of the network is made equal to the band traffic of the effective communication band.

In particular, under the circumstances of a wireless LAN or mobile system, the communication quality may be degraded depending on the place of use. Hence, the communication quality is required to be corrected at each place of use.

SUMMARY OF THE INVENTION

It is an object of the present invention to make the band control possible on the basis of the occurrence band information in the subnet without having to use a special hardware.

It is a further object of the present invention, in the network circumstance where the communication quality is irregular and deteriorated, to adjust the band traffic of various protocol control data including the retransmitted data taking place each time the communication quality is degraded by changing the communication granularity, the recovery strength and so forth and thereby to control the effective communication band and the quality correction of the data, for the purpose of more efficiently realizing the band control.

In carrying out the foregoing object, each node located in the subnet is required to grasp the occurrence band information in the subnet. For this purpose, each node is set to pick up and hold the band information of its own and transmit it to all the other nodes. Each node is set to hold the received band information of another node and the band information of its own. This makes it possible for each node to grasp a numeric value of the band traffic of the network and the contents of the band traffic (for example, a ratio of the communication data whose quality is to be guaranteed to the communication data whose quality is not to be guaranteed and which is to be communicated through an idle band). Each network may control the band traffic of the data to be transmitted on the basis of the grasped band traffic of the network.

According to an aspect of the invention, each node located in the network includes a band information obtaining unit for obtaining a communication attribute required for controlling the communication band from a communication application program and a band information storing unit for holding the obtained communication attribute as the band information of its own. Each node further includes a band information transmitting unit for transmitting the band information of its own held in the band information storing unit to all the other nodes and a band information receiving unit for receiving the band information transmitted from another node and storing it in the band information storing unit. Each node also includes a band traffic calculating unit for calculating a band traffic of the network at a time on the basis of the band informations of its own and the other nodes held in the band information storing unit and controlling the band traffic of the data to be transmitted on the basis of the calculated band traffic.

According to an aspect of the invention, in order to achieve the foregoing object, in a communication band control method for controlling a communication band of a network system having a plurality of nodes connected therewith, each of the nodes is arranged to obtain the communication attribute required for controlling the communication band from the communication application program, store the obtained communication attribute as the band information of its own node, deliver the band information of its own to all the other nodes connected to the network, store the band information delivered from another node as the band information of that node, calculate the current band traffic on the basis of the stored band informations of its own and the other nodes, determine the band as assuming the calculated band traffic as the band traffic of the network, and execute the band control in light of the determined result.

The communication attribute termed herein indicates the band information including an IP address, a port number, a band traffic, a data type, an operation application number, and a process ID list.

Further, according to the invention, in order to make the highly accurate band control possible even in the case that the communication quality is irregular depending on the place of use such as the case the network communication circumstance is a wireless or a mobile one, a communication quality correcting module is provided for adjusting the communication quality so that the band traffic derived as above is made equal to the band traffic of the effective communication data.

That is, each node includes a communication quality obtaining module for obtaining a communication data packet amount to be observed at the local node, the communication quality thereof and a communication quality attribute required for controlling the communication quality and a communication quality correcting module for calculating on the obtained communication quality the band traffic of the effective communication data, the band traffic thereof corresponding to the data derived by excepting the band traffic portion occupied by various protocol control data including the retransmitted data taking place when the application communication data is in communication from the obtained communication data packets of the local node, and then determining the obtained communication quality attribute so that the calculated band traffic is made equal to the band traffic calculated by the band traffic calculating module.

If the communication quality whose attribute is adjusted does not reach a predetermined level, the node deems the communication quality to be degraded, seeks the effective communication band traffic on which the predetermined communication quality is reached, and control the band on the basis of that effective communication band traffic.

The communication quality attribute termed herein includes a data packet length for determining a data communication granularity and control parameters such as a communication timing, and the other control parameters for data retransmission for determining the data recovery strength and error correction in the case of transmitting the communication data of the application program according to the band traffic calculated by the band traffic calculating module. The communication quality correcting module is served to determine the data communication granularity and the recovery strength on which the band traffic calculated by the band traffic calculating module may be guaranteed as the band traffic of the effective communication data, for the purpose of controlling the communication quality.

The foregoing arrangement makes it possible for each node to estimate the band traffic inside of a LAN by obtaining the number of operations of the communication application programs for each communication attribute and delivering it to all the nodes connected with the network without having to monitor the actual packets in the LAN.

Further, in a case that each node performs data communication according to the band traffic calculated as above, each node is served to calculate the band traffic of the effective communication data on the basis of the communication quality such as a communication data packet amount, data loss, and error correction data obtained from the I/O information of the communication data such as a TCP/IP protocol to be observed by the local node and to adjust the quality of the communication data so that the band traffic of the effective communication data is made equal to the controlled band traffic.

That is, the controlled band traffic of various protocols including the retransmitting traffic caused by the band traffic control can be adjusted by means of adjusting the data communication granularity and the recovery strength as observing the determined band traffic. Hence, this adjustment makes it possible to enhance the accuracy of the presumed band traffic as keeping the predetermined communication quality level.

Each node thus enables to grasp the overall band traffic on the band informations of its own and the other nodes and execute the band control on the basis of the band traffic of the overall grasped network for each communication.

In addition, if the subnet is divided into plural segments by means of the switching hub, the band information is allowed to be delivered to all the nodes by broadcasting the band information of its own to any other node.

BRIEF DESCRIPTION OF THE DRAWINGS

FIG. 3 is view showing a composition of a band information management table shown in FIG. 2;

DESCRIPTION OF THE EMBODIMENTS

Figure 1:
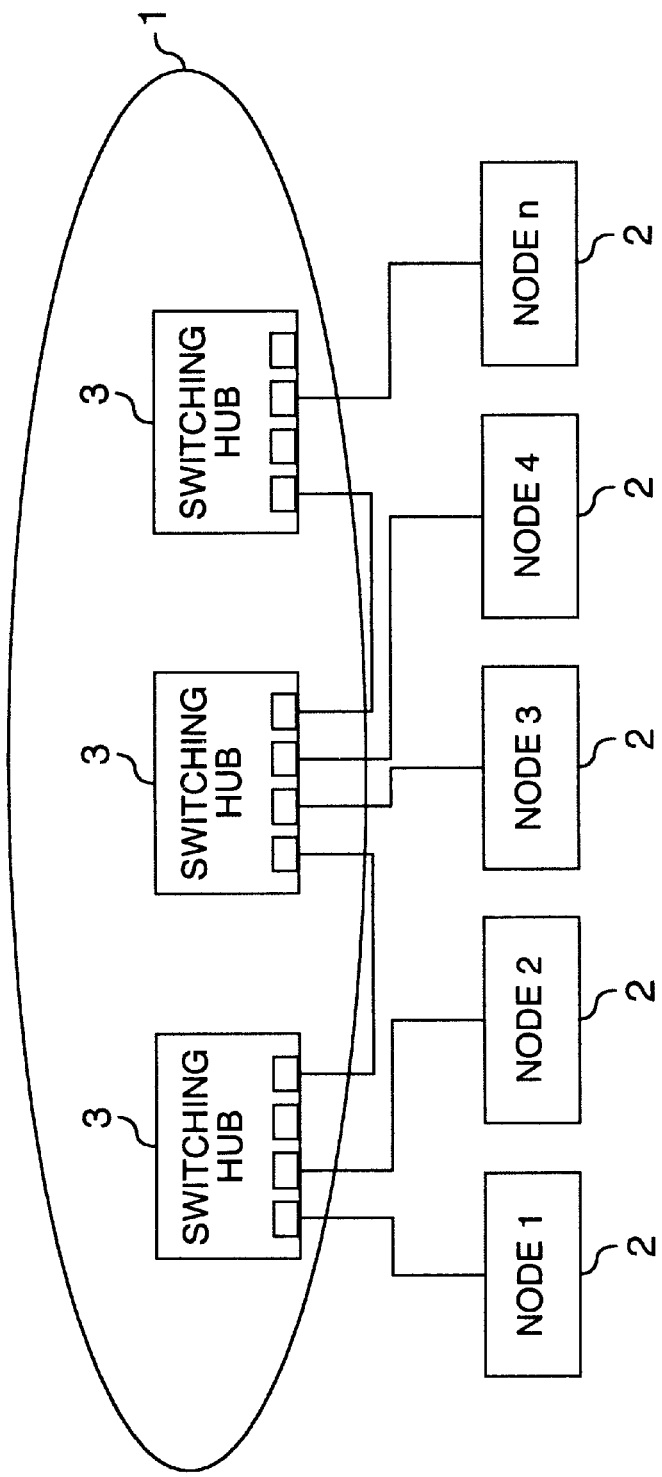
FIG. 1 is a diagram showing an overall system corresponding to an example of a network to which the invention is applied.

Hereafter, the embodiments of the invention will be described in detail along the appended drawings. FIG. 1 shows a system arrangement according to an embodiment of the invention. An IP network 1 is arranged to have a device provided with a switching function (switching hub 3). A plurality of nodes 2 are served to perform an IP communication through the network 1.

Figure 2:
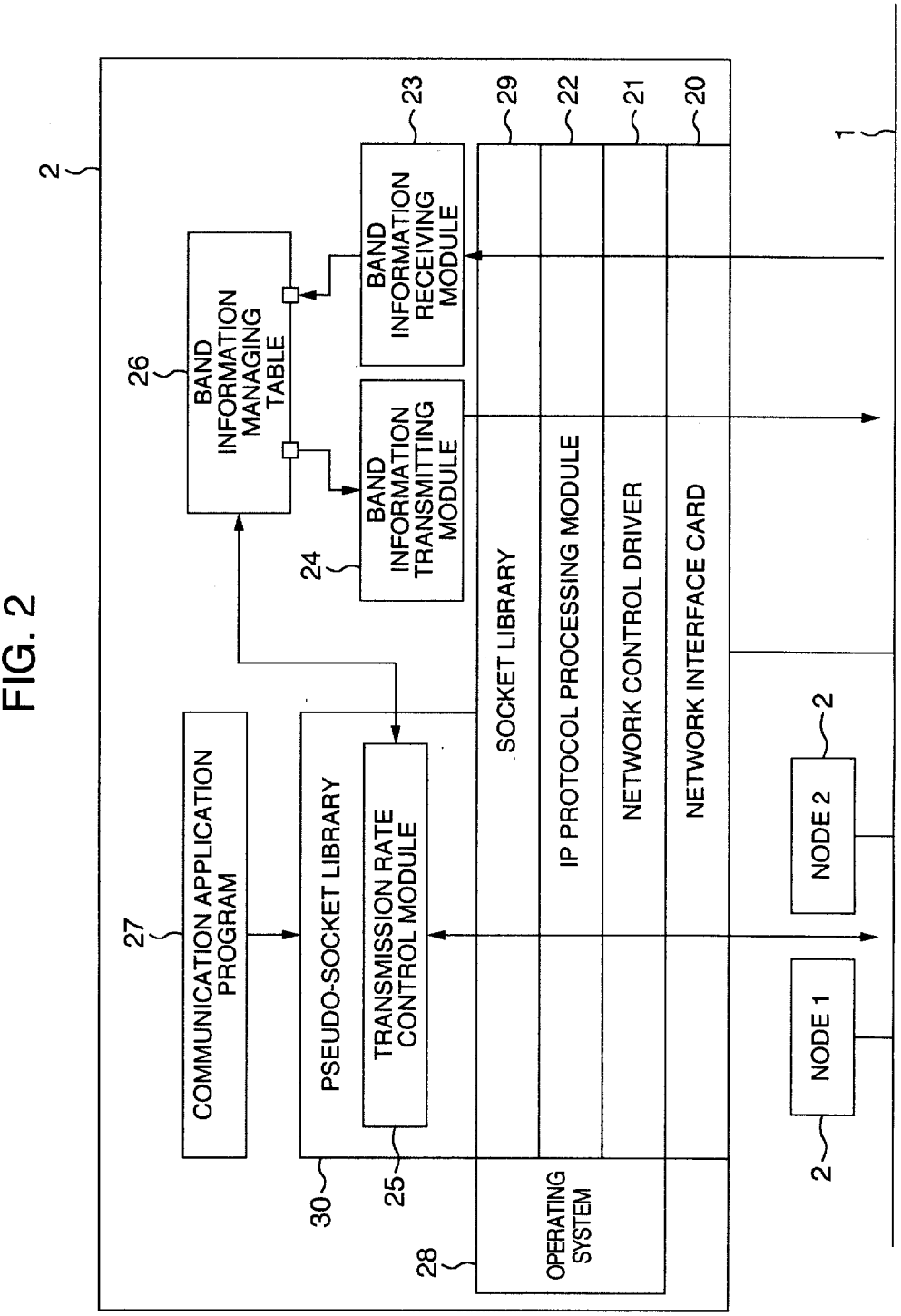
FIG. 2 is a block diagram showing an arrangement for embodying the present invention.

FIG. 2 shows a function arrangement inside of the node 2 that is performing the IP communication. The node 2 is arranged to have a communication application program 27, a pseudo-socket library 30, an operating system 28, a band information managing table 26, a band information transmitting module 24, a band information receiving module 23, and a network interface card 20. The pseudo-socket library 30, the operating system 28, the band information managing table 26, the band information transmitting module 24, and the band information receiving module 23 are all built by software.

The pseudo-socket library 30, the band information managing table 26, the band information transmitting module 24, and the band information receiving module 23 are the new inventive components.

The communication application program 27 is a program that receives and transmits data.

The pseudo-socket library 30 is connected to the communication application program 27, the operating system 28 and the band information managing table 26. The library 30 includes a transmission rate control module 25 that is served as a band information obtaining unit and a band traffic calculating unit. The pseudo-socket library 30 has the same application interface (API) as the socket library 29 included in the operating system 28 for the purpose of obtaining the transmitted content from the communication application program 27. In actual, what is done by this pseudo-socket library 30 is only hooking the content requested by the user. All the other functions are realized by invoking the socket library 29 included in the operating system 28. The transmission rate control module 25 is executed to create the band information on the transmission parameter sent from the communication application program 27 and then output the created band information to the band information managing table 26.

The operating system 28 is connected to the communication application program 27 and the pseudo-socket library 30. It includes as its function a socket library 29, an IP protocol processing module 22 for processing an IP protocol, and a network control driver 21 for controlling the network. The operating system 28 is also connected to the network 1 through the network interface card 20.

The band information managing table 26 served as a band information storing unit is connected to the pseudo-socket library 30, the band information transmitting module 24 and the band information receiving module 23. The table 26 stores the band information inputted from the transmission rate control module 25. Further, the table stores the band information of another node inputted from the band information receiving module 23.

The band information transmitting module 24 served as a band information delivering unit is connected to the band information managing table 26 and further to the operating system 28 and the network 1 through the network interface card 20. The band information transmitting module 24 is served to broadcast the band information of the local node stored in the band information managing table 26 to the network 1 through the socket library 29. The transmission rate control module 25 and the band information transmitting module are served to perform transmissions substantially on the same timing.

The band information receiving module 23 served as a band information receiving unit is connected to the band information managing table 26 and further to the operating system 28 and the network 1 through the network interface card 20. The band information receiving module 23 receives the band information transmitted by the band information transmitting module 24 of another node and then outputs it to the band information managing table 26.

The network interface card 20 is served to connect the foregoing arrangement with the network 1 so that it relays the data transfer therebetween.

FIG. 3 shows a composition of the band information managing table 26. The band information managing table 26 is composed of a local node table 261 for storing the information of the local node and another node table 262 for storing the information of another node. Another node table 262 has the same structure as the local node table 261 (shown). The number of another node table 262 is set to correspond to the number of the other nodes. The band information managing table 26 stores as the information for specifying a communication data flow and a data type an IP address 263, a port number 264, a band traffic 265, a number of the operating applications 267, and a process ID list 268.

The IP address (for specifying another side) 263, the port number (for identifying the communicating content) 264, the band traffic 265, and the type 266 are set by the user and thus pre-stored. The type 266 indicates "QoS" or "BE", in which "QoS" means the communication quality is guaranteed by securing the communication band specified by the IP address 263 and the port number 264, while "BE" means the communication is executed at the best-effort mode.

The number of the operating applications 267 and the process ID list 268 are dynamically set by the transmission rate control module 25 (herein, "dynamically" means "for each communication"). The number of the operating applications 267 corresponds to the number of the processes in which the communication specified by the IP address 263 and the port number 264 is being executed. The process ID list 268 stores an identifier (number) of the process.

Figure 4:
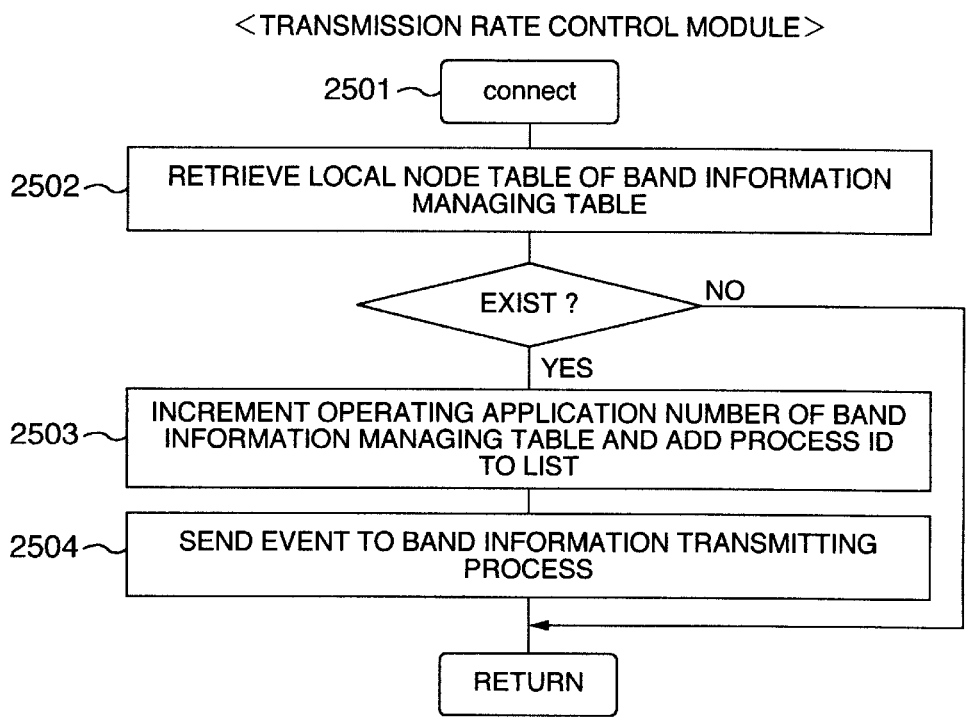
FIG. 4 is a flowchart showing an operation of a transmission rate control module shown in FIG. 2.
Figure 5:
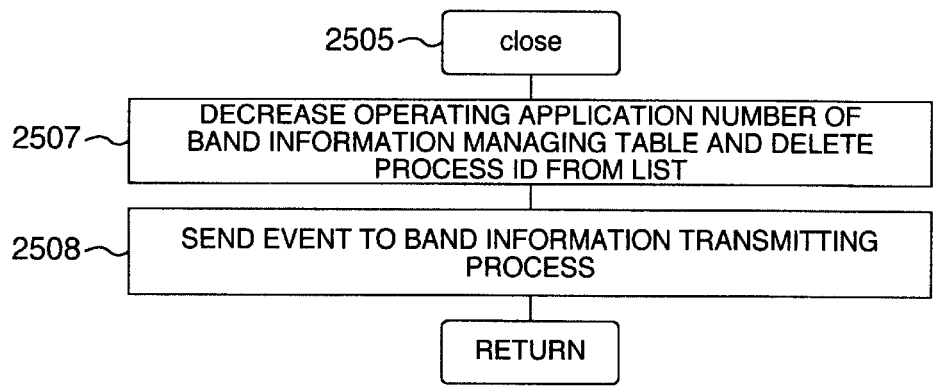
FIG. 5 is a flowchart showing another operation of a transmission rate control module shown in FIG. 2.
Figure 6:
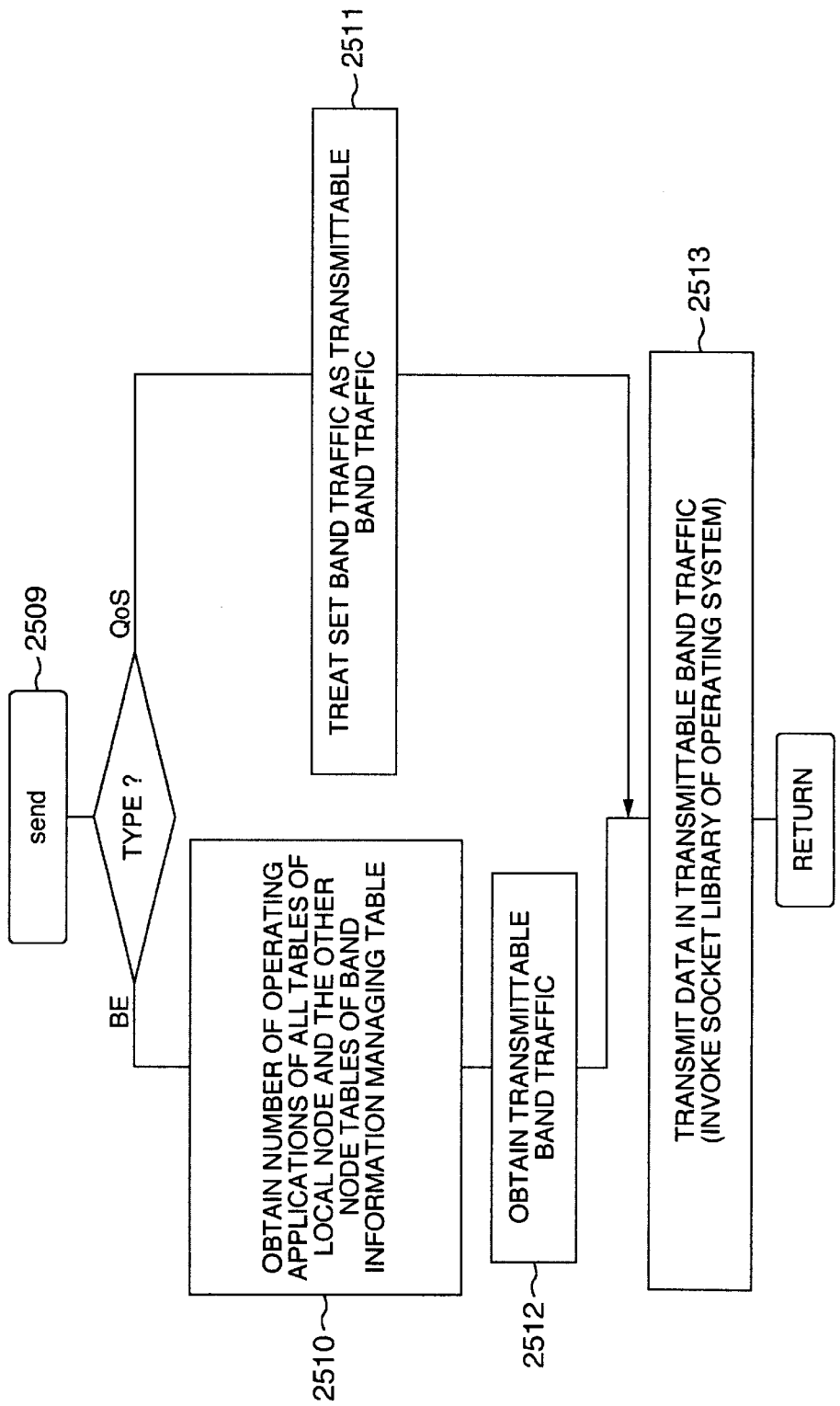
FIG. 6 is a flowchart showing another operation of a transmission rate control module shown in FIG. 2.

FIGS. 4, 5 and 6 show the processing flow of the transmission rate control module 25. The transmission rate control module 25 served as a band traffic calculating unit is mounted as a function of the pseudo-socket library 30. Hence, the processing itself is executed in accordance with the request given by the communication application program 27. The socket library includes as its functions a function "connect" (2501 in FIG. 4) issued at the start point of the communication, a function "close" (2505 in FIG. 5) issued at the end time of the communication, and a function "send" (2509 in FIG. 6) sending the data. Since these functions are invoked from the communication application program 27, the function "connect" (2501) is executed to detect an occurrence of a data flow to be communicated, the function "close" (2505) is executed to detect disappearance of a data flow to be communicated, and the function "send" (2509) is executed to detect a request for transmitting the data, for the purpose of obtaining the band information and controlling the band.

The function "connect" (2501) is executed to retrieve (process 2502) the IP address 263 and the port number 264 set to the local node table 261 of the band information managing table 26 with the IP address and the port number specified by the function "connect" (2501) as a key. If an entry is retrieved, a numeric value "1" is added to the number of the applications in the entry and the local process (the process number of the communication application program 27) is added to the process ID list (process 2503). Further, since the changed table is required to be notified to all the nodes, an event (indication of transmission) is sent to the band information transmitting module 24 (process 2504).

The function "close" (2505) is executed to subtract 1 from the application number in the entry found by the retrieval (process 2502), delete the local process (process number of the communication application program 27) from the process ID list (process 2507), and then send an event to the band information transmitting module 24 (process 2508).

The function "send" (2509) is executed to do a process for adjusting a rate of the data to be actually transmitted. The rate is determined according to the maximum allowable data amount for a unit time, that is, the band traffic. The data amount per a unit time is adjusted by delaying the data for each data size. The allowable transmission band traffics are respective in the types QoS and BE as follows.

(1) For QoS, the set band traffic is treated as the allowable transmission band traffic.

(2) For BE, the band traffic derived by subtracting the band traffic used for QoS from the band traffic allocated to BE is treated as the allowable transmission band traffic. That is, it may be calculated as follows.

Allowable transmission band traffic=Band traffic set to BE/Number of operating applications−Band traffic used for QoS Band traffic set for BE=Band traffic provided when the type set to the band information managing table 26 is BE Band traffic used for QoS=Band traffic set for QoS×Number of operating applications As noted above, if the type is BE, the function "send" is executed to derive the number of the operating applications for each communication path from the delivered band information managing tables of all the nodes (process 2510), determine the transmittable band traffic on the derived number of the operating applications (process 2512), while if the type is QoS, the function "send" is executed to process the set band traffic as the transmittable band traffic (process 2511). The transmission rate, that is, the transmission frequency is adjusted according to the derived transmittable band traffic (process 2513). The flowcharts shown in FIGS.

4 to 6 are depicted on the TCP/IP-based communication. In UDP/IP, the process for the function "connect" and the process for the function "send" are included in the function "sendto"

Figure 7:
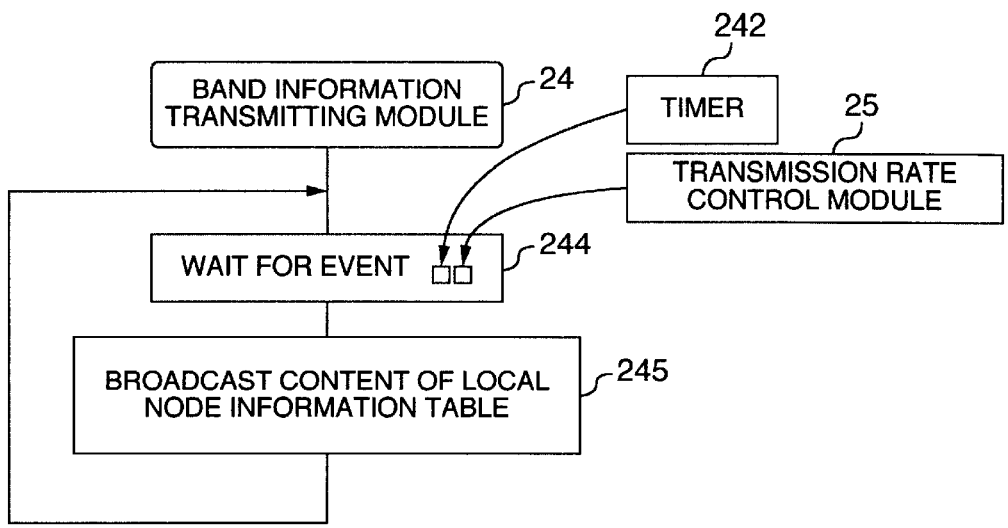
FIG. 7 is a flowchart showing an operation of a band information transmission module shown in FIG. 2.

FIG. 7 shows the processing flow of the band information transmitting module 24. When this module is started, the module enters into the waiting state for an event for requesting a band information transmission from a timer 242 and the transmission rate control module 25 (process 244). That is, the process is executed to periodically perform a transmission on a timer and activate the communication application program 27 to start the communication. The reason why the periodic transmissions are done is to make sure that a message is positively reached. That is, since the band information (band information managing table) of the local node table is broadcast (process 245), the message does not always reach the destination merely by one transmission. The periodic transmissions thus guarantee the reach of the message.

Figure 8:
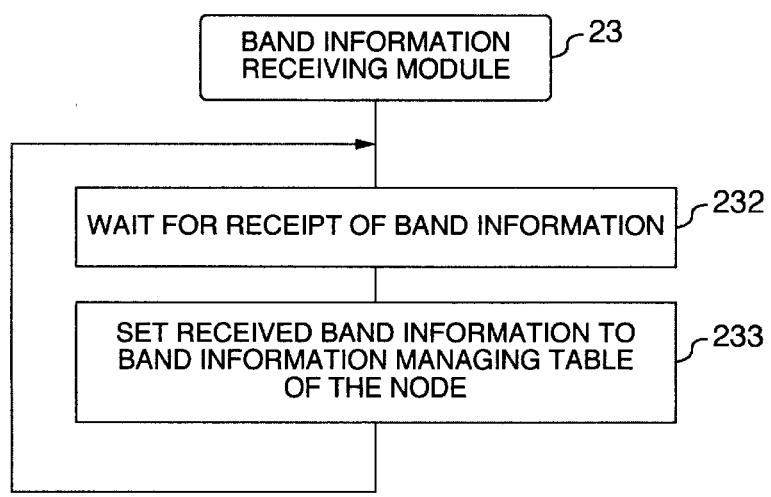
FIG. 8 is a flowchart showing an operation of a band information receiving module shown in FIG. 2.

FIG. 8 shows the processing flow of the band information receiving module 23. When this module is started, the module enters into the state of waiting for the band information. In receipt of the band information of another node, the received content is set to the band information managing table whose index is the node number.

According to the foregoing embodiment, the process is executed to obtain the number of the operations of the communication application program for each communication attribute and then deliver the number to all the nodes connected with the network. This process thus makes it possible for each node to estimate the band traffic within the LAN without actually monitoring the packets passing through the LAN. The communication attribute termed herein is the band information, which collectively represents an IP address, a port number, a band traffic, a data type, a number of the operating applications, and a process ID list. Hence, each node provides a capability of controlling the band on the basis of the network band traffic at a time for each communication.

If the subnet is divided into plural segments by the switching hub, by broadcasting the band information to the other nodes, each node can obtain the band information of another node.

In turn, the description will be oriented to the second embodiment of the present invention. The second embodiment is arranged to adjust the communication granularity and the recovery strength in the network circumstance where the communication quality is irregular and often degraded and change the protocol control data amount including the retransmitted data caused by the adjustment for the purpose of performing the band control with high accuracy.

Figure 9:
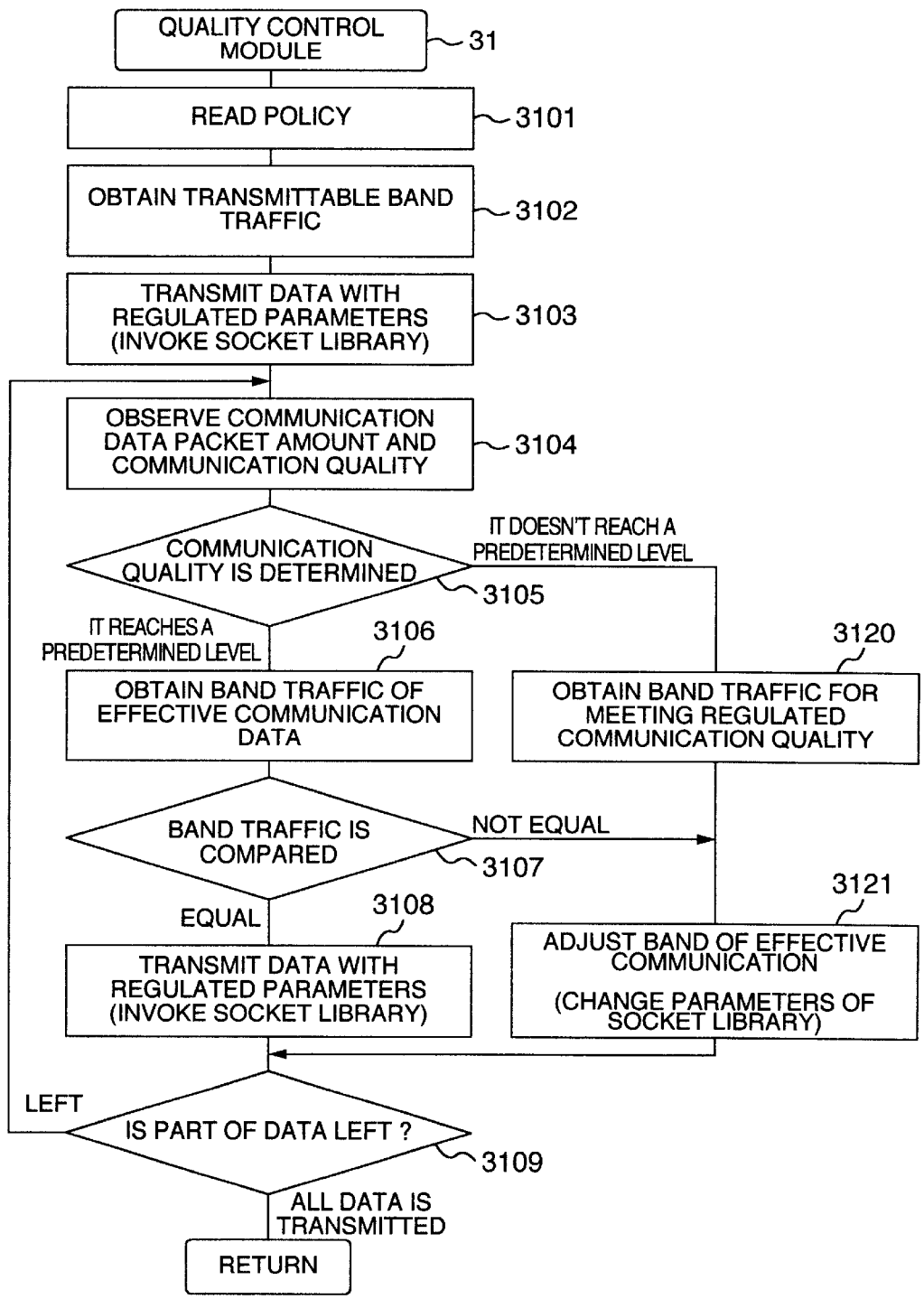
FIG. 9 is a flowchart showing an operation of a quality control module shown in FIG. 2.

FIG. 9 shows a processing flow of a quality control module 31. This module is served to change the communication granularity and the recovery strength in communicating data so that the effective communication data amount is made equal to the transmittable band traffic determined by the transmitting rate control module 25 and to change the band of the protocol control data including the retransmitted data caused depending on that change.

When started, the subject module is served to refer to the policy and obtain the regulated default control parameters and the control policy (process 3101). Though this policy is not shown, it is predefined at the node in charge of the policy and is distributed in advance of the control. Each node performs the control process according to this policy.

After obtaining this policy, this module is then served to obtain the transmittable band traffic determined by the transmission rate control module 25 (process 3102), invoke a socket library with the regulated parameters, and then transmit it (process 3103). For example, if the band traffic is 5 Kbytes/sec and the regulated packet size is 500 bytes, the delay is determined to be 100 milliseconds. Then, the module is served to observe the communication quality data such as a communication data packet amount and data loss information, which are obtained from the I/O information of the communication data of the TCP/IP protocol (process 3104). In addition, in the process 3104, an operation is executed to obtain the control parameters for data recovery strength such as retransmitting times and retransmitting time intervals as the other communication quality attribute.

Then, if the communication quality observed in the process 3104 reaches the communication quality level obtained by the policy in the step 3101 by comparison therebetween (process 3105), the subject module is served to calculate the band traffic of the effective communication data (process 3106) and then compare this band traffic with the transmittable band traffic determined by the transmission rate control module 25, obtained in the process 3102. If both are equal, like the process 3103, the module is served to invoke the socket library with the regulated parameters and then transmit it (process 3108).

For example, if the policy obtained at the process 3101 indicates "the quality level is N or less occurrences of the retransmitted data and if the effective quality reaches that quality level, the data is transmitted with the packet size of 1K bytes", in the process 3108, the parameters used for invoking the socket library are changed such that the packet size is changed from 500 bytes into 1 K bytes and the delay is changed from 100 to 200 milliseconds. Then, the data is transmitted. That is, in the process 3108, the data flow granularity is changed so that the transmittable band traffic 5 K bytes/second may be kept before transmitting the data.

If some of the communication data is left, the module is served to repeat the operation from the process 3104 for observing the communication status of the process 3108 and, if no data is left, terminate the process (process 3109).

If the transmittable band traffic is determined not to be equal to the effective band traffic as a result of the comparison in the step 3107, the module is served to adjust the band traffic of the effective communication data (process 3121).

For example, if the policy obtained in the process 3101 indicates "If both of the band traffics are not equal though the communication quality reaches a predetermined level, the data is transmitted with the packet size of 400 bytes for improving the probability of the successful retransmission and the retransmitting time interval of the data recovery strength is doubled", in the process 3121, the parameters used for invoking the socket library are adjusted such as the packet size is change from 500 to 400 bytes and the delay is changed from 100 to 80 milliseconds and the retransmitting time interval is doubled before transmitting the data. That is, in the process 3121, the data granularity and the recovery strength are changed so as to keep the transmittable band traffic of 5 K bytes/sec before transmitting the data.

Like the foregoing process, if a portion of the communication data is left, the module is served to repeat the operation from the process 3104 for observing the communication status of the process 3121 and, if no communication data is left, terminate the process (process 3109).

This process is intended for the case that the communication quality reaches the predetermined level. If in the process 3105 the communication quality does not reach the predetermined level, the module is served to obtain the band traffic for meeting the regulated communication quality (process 3120) and then adjust the band traffic of the effective communication data (process 3121).

That is, in this case, the quality state is degraded, that is, irregular and the transmittable band traffic determined by the transmission rate control module 25 is determined to be pressed by the retransmitted data. In this state, the subject module is served to obtain the effective communication band traffic for meeting the regulated communication quality and then transmit the data according to the obtained band traffic.

For example, if the policy obtained in the process 3101 indicates "If the communication quality does not reach N or less occurrences of the retransmitted data, the error correction is changed to a double strength correction and the retransmitting time interval is changed into a double value, the effective communication band traffic is made to be the band traffic obtained as a result of the change", in the process 3121, the parameters used for invoking the socket library are adjusted such that the error correction is changed into a double strength correction and the retransmitting time interval is changed into a double value before transmitting the data.

Like the foregoing process, if a portion of the communication data is left, the subject module is served to repeat the operation from the process 3104 for observing the communication result status of the process 3121. In this case, the data is transmitted with the obtained band traffic until the communication quality recovers into a predetermined quality level.

According to the second embodiment, if the data communication is performed according to the band traffic calculated at each node, the subject module is served to calculate the band traffic of the effective communication data on the basis of the communication data packet amount and the communication quality obtained from the I/O information of the communication data such as a TCP/IP protocol to be observed by the local node and then adjust the quality of the communication data so that the calculated band traffic is made equal to the controlled band traffic.

That is, the subject module is served to change the data communication granularity and the recovery strength as keeping the band traffic determined by the first embodiment for the purpose of adjusting the band traffic of various protocol control data including the retransmitted data occurring in association with the change. This adjustment makes it possible to keep the communication quality at the predetermined level and enhance the accuracy of the band traffic.

According to the invention, this band control within the subnet makes it possible to obtain the transmittable band traffic for each communication on the basis of the occurrence band information within the subnet without any special hardware if the subnet is divided into plural segments by means of the switching hub. Hence, the band control may be executed according to the transmittable band traffic and the data type.

Even in the network circumstances where the communication quality is irregular and so often degraded, the band traffic of various protocol control data including the retransmitted data occurring depending on the degraded quality is adjusted by changing the data communication granularity and recovery strength so that the data effective communication band and quality correction may be made possible. Hence, the band control can be more accurately performed.

What is claimed is:

1. A network system having a plurality of local nodes connected therewith, said local nodes each including communication application programs, by which the local node is operated, each of said local nodes comprising:

band information obtaining means for obtaining band information required for controlling a communication band from said communication application programs;

band information storing means for storing said band information obtained by said band information obtaining means as the band information of the local node;

band information delivering means for delivering the band information of the local node to the other local nodes connected to said network;

band information receiving means for receiving the band information delivered by said band information delivering means of the other local nodes and storing the band information of the other local nodes in said band information storing means;

band traffic calculating means for calculating a current band traffic for the local node to which it belongs on the basis of the band information of the local node to which it belongs and the band information of the other local nodes stored in said band information storing means; and said band traffic calculating means assuming current band traffic that is obtained to be the band traffic of said network and controlling the band traffic of the local node to which it belongs on the basis of that assumption, wherein each of said local nodes includes:

a communication quality obtaining means for obtaining:

a communication data packet amount to be observed by the local node, the communication quality thereof, and a communication quality attribute required for controlling said communication quality, and a communication quality correcting means for:

calculating, based on said obtained communication quality, a calculated result comprising a band traffic of effective communication data, said band traffic thereof corresponding to an obtained communication data packet of the local node excepting a band traffic occupied by various protocol control data including the retransmitted data occurring in communicating application communication data, and determining said obtained communication quality attribute so that said calculated result is made equal to the band traffic obtained by said band traffic calculating means, and said communication quality correcting means is adapted to determine a communication quality to be guaranteed by assuming the band traffic obtained by said band traffic calculating means as the band traffic of the effective communication data, for controlling the band traffic according to said communication quality.

2. A network system as claimed in claim 1, wherein said communication quality attribute includes a data packet length for determining a data communication granularity and control parameters such as a communication timing, which are used in transmitting the application program communication data according to the band traffic calculated by said band traffic calculating means, and the other control parameters such as retransmission and error correction for determining a data recovery strength, and said communication quality correcting means is adapted to determine a data communication granularity and recovery strength on which the band traffic obtained by said band traffic calculating means is to be guaranteed as the band traffic of the effective communication data, for controlling the communication quality on said band traffic.

3. A network system as claimed in claim 1, wherein said communication quality correcting means assumes the communication quality to be degraded if the communication quality obtained by adjusting the communication quality attribute obtained by said communication quality obtaining means does not reach a predetermined level and then obtain the band traffic of the effective communication for meeting said predetermined quality level, for performing the band control on said obtained band traffic.

4. A communication band of a network system having a plurality of local nodes connected therewith, each of said local nodes taking the steps of:
  obtaining band information required for controlling a communication band from a communication application program;
  storing said obtained band as the band information of the local node and delivering said band information to all the other local nodes connected with said network;
  storing band information delivered by other local nodes as band information of the other local nodes;
  obtaining a current band traffic for the local node to which it belongs on the basis of the band information of the local node and the band information of the other local nodes, which has been stored; and
  assuming the current band traffic for the local node to which it belongs that is obtained to be the traffic of said network and controlling the band traffic of the local node on the basis of that assumption, wherein each of said local nodes is adapted:
    to obtain:
      a communication data packet amount to be observed by the local node,
      the communication quality thereof, and
      a communication quality attribute required for controlling the communication quality and
    to calculate on said obtained communication quality the band traffic of the effective communication data corresponding to the obtained communication data packet of the local node excepting the band traffic occupied by various protocol control data including the retransmitted data occurring in communicating the application communication data and
    to determine said obtained communication quality attribute so that said calculated result is made equal to said band traffic, for controlling the communication quality.

5. A communication band control method as claimed in claim 4, wherein:
  said communication quality attribute includes a data packet length for determining a data communication granularity and control parameters such as a communication timing, used in transmitting the application program communication data according to said band traffic, the other control parameters such as retransmission and error correction for determining a data recovery strength, and
  said method determines the data communication granularity and recovery strength on which the band traffic can be guaranteed as the band traffic of the effective communication data, for controlling the communication quality thereon.

6. A communication band control method as claimed in claim 4, wherein, if a communication quality obtained as a result of adjusting an obtained communication quality attribute does not reach a predetermined quality level, an operation is executed to obtain an effective level of communication band traffic which meets said predetermined communication quality, for controlling the band traffic thereon.

7. A communication band control method as claimed in claim 4, wherein the delivery of the band information of the local node to the other local nodes is executed in a broadcasting manner.

8. A communication band control method for controlling a communication band of a network system having a plurality of local nodes connected therewith, each of said local nodes taking the steps of:
  obtaining band information required for controlling a communication band from a communication application program;
  storing said obtained band information as the band information of the local node and delivering said band information to all the other local nodes connected with said network;
  storing band information delivered by other local nodes as band information of the other local nodes;
  obtaining a current band traffic for the local node to which it belongs on the basis of the band information of the local node and the band information of the other local nodes, which has been stored; and
  assuming the current band traffic for the local node to which it belongs that is obtained to be the traffic of said network and controlling the band traffic of the local node on the basis of that assumption as, wherein each of said local nodes takes the further steps of detecting occurrence of a communication whose quality is to be guaranteed from the band information of the local node and the other local nodes stored as above and securing the communication band of the communication whose quality is to be guaranteed by decreasing a transmission rate of a communication whose quality is not to be guaranteed.

9. A communication band control method as claimed in claim 4, wherein each of said local nodes takes further steps of detecting occurrence of a communication whose quality is to be guaranteed from the band information of the local node and the other local nodes stored as above and securing the communication band of the communication whose quality is to be guaranteed by decreasing a transmission rate of a communication whose quality is not to be guaranteed.

10. A communication band control method as claimed in claim 6, wherein an identifier for specifying an application program is stored with said band information.

11. A network system having a plurality of local nodes connected therewith, said local nodes each including communication application programs, by which the local node is operated, each of said local nodes comprising:
  a band information obtaining unit which obtains band information required for controlling a communication band from said communication application programs;
  a band information managing table which stores said band information obtained by said band information obtaining unit as the band information of the local node;
  a band information delivery unit which delivers the band information of the local node to the other local nodes connected to said network;
  a band information receiver which receives the band information delivered by said band information delivery units of the other local nodes and storing the band information of the other local nodes in said band information managing table;

a band traffic calculator which calculates a current band traffic for the local node to which it belongs on the basis of the band information of the local node to which it belongs and the band information of the other local nodes stored in said band information managing table; and said band traffic calculator assuming current band traffic that is obtained to be the band traffic of said network and controlling the band traffic of the local node to which it belongs on the basis of that assumption, wherein each of said local nodes includes:

a communication quality obtaining unit which obtains:
a communication data packet amount to be observed by the local node,
the communication quality thereof, and
a communication quality attribute required for controlling said communication quality, and a communication quality correcting unit which:
calculates, based on said obtained communication quality, a calculated result comprising a band traffic of effective communication data, said band traffic thereof corresponding to an obtained communication data packet of the local node excepting a band traffic occupied by various protocol control data including transmitted data occurring in communicating application communication data, and determines said obtained communication quality attribute so that said calculated result is made equal to the band traffic obtained by said band traffic calculator, and said communication quality correcting unit being adapted to determine a communication quality to be guaranteed by assuming the band traffic obtained by said band traffic calculator as the band traffic of the effective communication data, for controlling the band traffic according to said communication quality.

* * * * *